(12) United States Patent
Yeh et al.

(10) Patent No.: US 8,803,833 B2
(45) Date of Patent: Aug. 12, 2014

(54) TOUCH PANEL AND METHOD FOR PROCESSING SIGNALS OF THE TOUCH PANEL

(75) Inventors: Chien-Lin Yeh, Taoyuan County (TW); Chun-Cheng Hou, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 62 days.

(21) Appl. No.: 13/531,069

(22) Filed: Jun. 22, 2012

(65) Prior Publication Data
US 2013/0201119 A1 Aug. 8, 2013

(30) Foreign Application Priority Data
Feb. 3, 2012 (TW) .............................. 101103528 A

(51) Int. Cl.
*G06F 3/041* (2006.01)
*G09G 5/10* (2006.01)
*G09G 3/36* (2006.01)
*G09G 5/00* (2006.01)
*G06F 13/372* (2006.01)

(52) U.S. Cl.
USPC ............. 345/173; 345/691; 345/99; 345/633; 345/534

(58) Field of Classification Search
CPC ..... G06F 3/0488; G06F 3/4883; G06F 3/044; G06F 3/011; G09G 3/2014; G09G 3/2022; G09G 3/2029; G09G 3/3648; G09G 3/3688; G09G 3/3611; G09G 5/395; G09G 5/363; G09G 5/393; G06T 19/00
USPC ........................... 345/173, 691, 99, 633, 534
See application file for complete search history.

(56) References Cited

U.S. PATENT DOCUMENTS

| | | | | |
|---|---|---|---|---|
| 2010/0182262 A1* | 7/2010 | Yoshikawa et al. | ........... | 345/173 |
| 2012/0056834 A1* | 3/2012 | Kim et al. | ..................... | 345/173 |
| 2012/0056835 A1* | 3/2012 | Choo et al. | .................... | 345/173 |

FOREIGN PATENT DOCUMENTS

| | | |
|---|---|---|
| CN | 101145325 A | 3/2008 |
| CN | 102221934 A | 10/2011 |
| TW | 200705246 | 2/2007 |

* cited by examiner

*Primary Examiner* — Aneeta Yodichkas
(74) *Attorney, Agent, or Firm* — WPAT, PC; Justin King

(57) ABSTRACT

A touch panel includes a display module, a touch sensor and a signal processing unit. The display module includes a timing control circuit and a data driving circuit, wherein the timing control circuit outputs latch signals to the data driving circuit, and the display module generates surface noises. The touch sensor is disposed above the display module and outputs abnormal signals, wherein the abnormal signals include a sensing signal and the surface noises. The signal processing unit is electrically connected to the touch sensor and receives the abnormal signals, wherein the signal processing unit calculates a predetermined time by utilizing a rising edge or a falling edge of the latch signal, suspensively processes the sensing signal during the predetermined time, and then continuously processes the sensing signals beyond the predetermined times so as to keep away from each period of the surface noises.

9 Claims, 8 Drawing Sheets

TOUCH PANEL AND METHOD FOR PROCESSING SIGNALS OF THE TOUCH PANEL

CROSS-REFERENCE TO RELATED APPLICATION

This application claims the benefit of Taiwan Patent Application No. 101103528, filed on Feb. 3, 2012, which is hereby incorporated by reference for all purposes as if fully set forth herein.

BACKGROUND OF THE INVENTION

1. Field of Invention

This invention relates to a method for processing signals, and more particularly to a method for processing signals of a touch panel.

2. Related Art

Techniques of touch panels are advanced in recent years, such as resistive touch panels, capacitive touch panels, surface acoustic wave touch panels, and optical touch panels. The said techniques have been applied to communication products, computer devices and consumer electronic products for increasing functions of said applied products and convenient usage.

The capacitive touch panels can be operated by fingers without pressing the capacitive touch panels heavily, so the capacitive touch panels has no disadvantage of a stress caused by repeatedly touching the touch panel, and a damage caused by deformation. Advantages of the capacitive touch panels are that the capacitive touch panels are with simple structures, less elements and a high product yield rate, so the capacitive touch panels are adapted for mass production, whereby the cost of the capacitive touch panels can be reduced.

FIG. 1 shows a cross sectional view of a conventional touch sensor 100. The touch sensor 100 includes a glass substrate 110, two optically clear adhesive (OCA) layers 120, an indium tin oxide (ITO) layer 130 and a cover lens 140. A gap of the touch sensor 100 between the glass substrate 110 and the ITO layer 130 is filled with one of the two OCA layers 120 for bonding the glass substrate 110 and the ITO layer 130; the other gap of the touch sensor 100 between the ITO layer 130 and the cover lens 140 is filled with another OCA layer 120 for bonding the ITO layer 130 and the cover lens 140.

FIG. 2 is a cross sectional view of a conventional touch panel 200. The conventional touch panel 200 includes the touch sensor 100 and a liquid crystal display module (LCM) 250. The touch sensor 100 is located above the LCM 250. An air gap 260 is formed between the glass substrate 110 and the LCM 250.

FIG. 3 is a schematic view showing signal processing of the conventional touch panel. The conventional touch panel includes the touch sensor 100, an analog to digital (A/D) converter 330, a microcontroller 340, a transmission interface 350 and an operating system 360. When the touch panel 200 is touched, a corresponding capacitance value is changed. Then, the touch sensor 100 outputs an analog signal to the A/D converter 330. The A/D converter 330 converts the analog signal to a digital signal, and then outputs the digital signal to the microcontroller 340. The microcontroller 340 processes the digital signal, and then outputs a control signal. Finally, the control signal is transmitted to an operating system 360 through the transmission interface 350 for determining touch locations of the touch panel 200.

However, after a touch sensor is assembled on an LCD module, the touch sensor is interfered by noises generated from the LCD module so as to cause a misjudgment of touch locations. For example, when the LCD module is normally operated, different surface noises are generated by different pictures of the LCD module. For another example, when the picture of the LCD module is fast updated or is in a heavy loading, an unstable voltage (i.e. surface noise) is detected from a surface of the LCD module. FIG. 4 is timing charts of the surface noises of the LCD module. When red, green and blue (RGB) pixels of the LCD module show a picture having bright lines and dark lines separated from one another, or the RGB pixels of the LCD module show a black picture (heavy loading), the surface noises can be generated.

Accordingly, a problem of the surface noises for the touch panel and a method for processing signal of the touch panel needs to be solved.

SUMMARY OF THE INVENTION

A purpose of the present invention is to solve a touch sensor interfered with surface noises from a display module of the touch panel.

This invention provides a touch panel including a display module, a touch sensor and a signal processing unit. The display module includes a timing control circuit and a data driving circuit, wherein the timing control circuit outputs latch signals to the data driving circuit, and the display module generates surface noises. The touch sensor is disposed above the display module and outputs abnormal signals, wherein the abnormal signals include a sensing signal and the surface noises. The signal processing unit is electrically connected to the touch sensor and receives the abnormal signals, wherein the signal processing unit calculates a predetermined time by utilising a rising edge or a falling edge of the latch signal, suspensively processes the sensing signal during the predetermined time, and then continuously processes the sensing signals beyond the predetermined times so as to keep away from each period of the surface noises.

This invention further provides a method for processing signals processing method of a touch panel, the method comprising the following steps of: in Step A, providing a display module and a touch sensor, wherein the display module comprises a timing control circuit outputting latch signals, the display module generates surface noises, the touch sensor is deposed above the display module and outputs abnormal signals which each comprise a sensing signal and the surface noises; in Step B, receiving the abnormal signals and calculating a predetermined time according to a rising edge or a falling edge of each duty period of the latch signals; and in Step C, suspensively processing the sensing signals during the predetermined time and then continuously processing the sensing signals beyond the predetermined times so as to keep away from each period of the surface noises.

The touch panel including the signal processing unit of this invention can solve a misjudgment problem that the touch sensor is interfered by surface noises from the display module.

In order to make the aforementioned and other objectives, features and advantages of the present invention comprehensible, embodiments are described in detail below with reference to the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
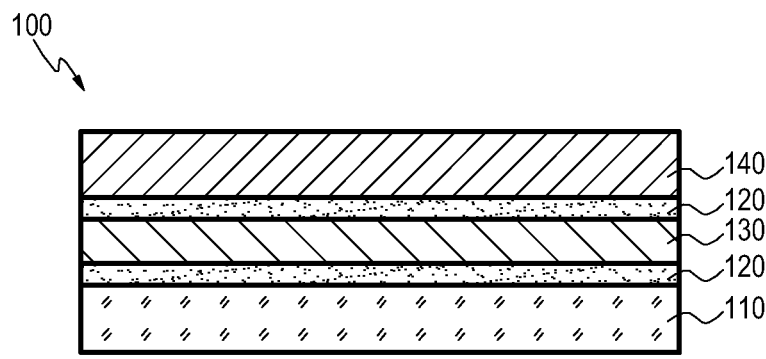
FIG. 1 is a cross sectional view of a conventional touch sensor.
Figure 2:
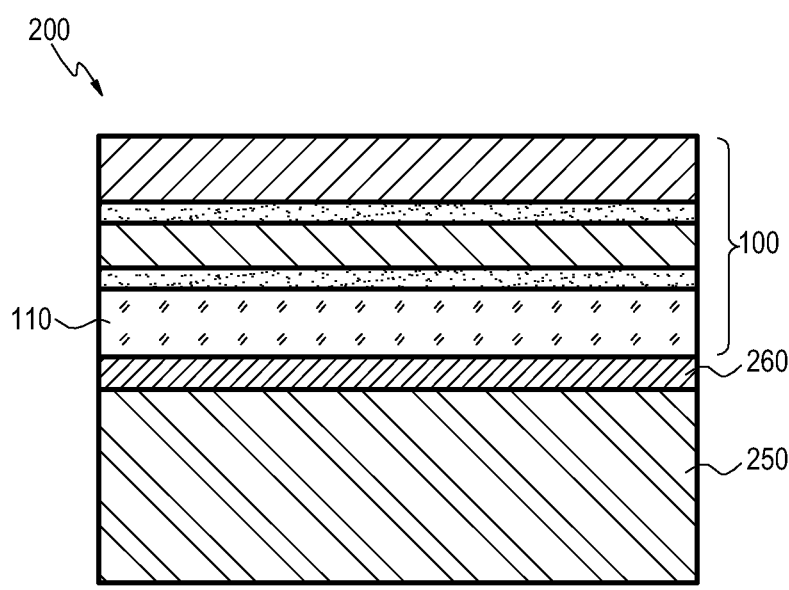
FIG. 2 is a cross sectional view of a conventional touch panel.
Figure 3:
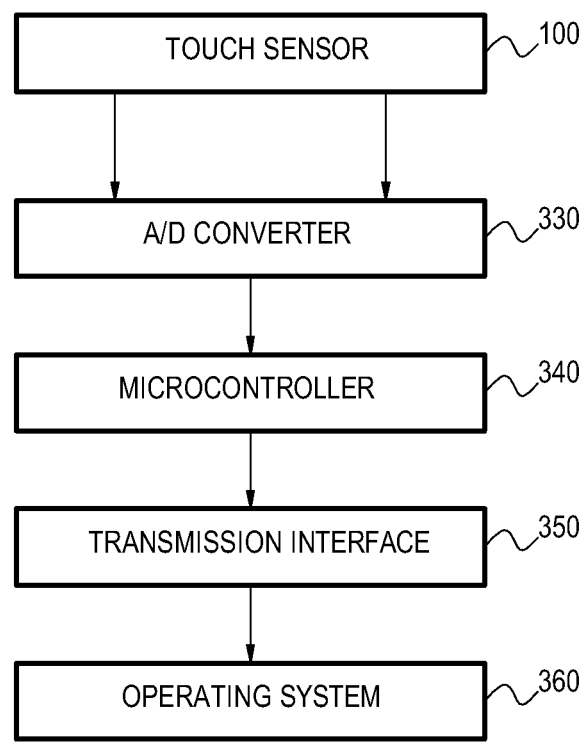
FIG. 3 is a schematic view showing signal processing of the conventional touch panel.
Figure 4:
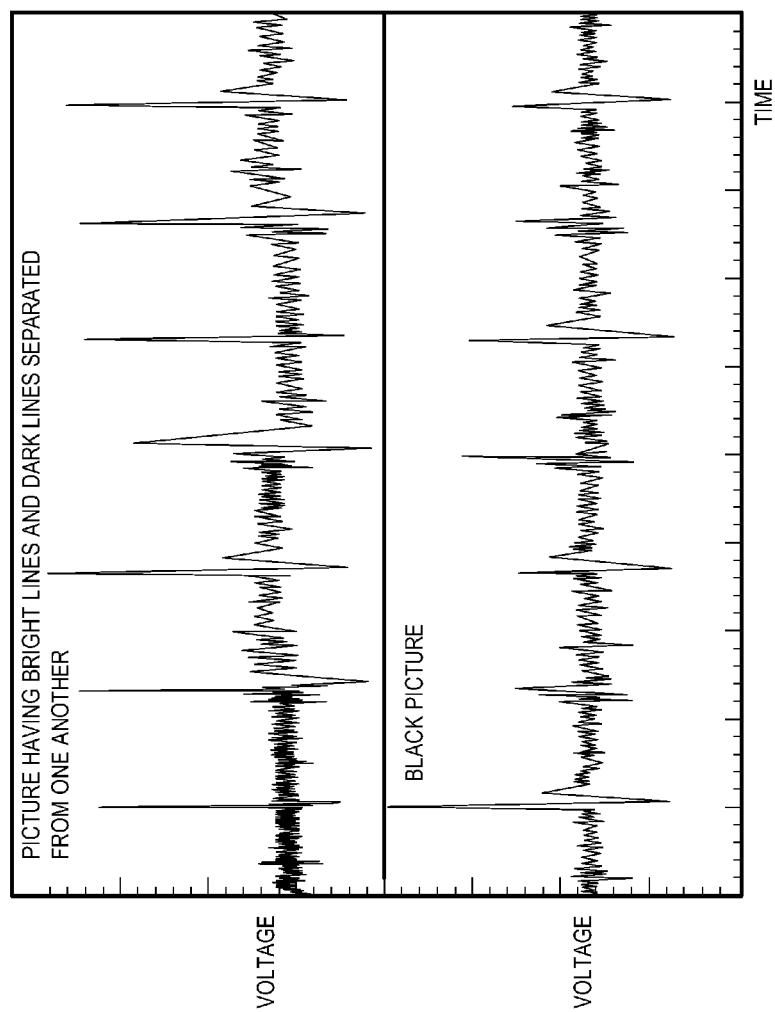
FIG. 4 is timing charts of surface noises of an LCD module, wherein a longitudinal axis shows voltage and a transverse axis shows time.
Figure 5:
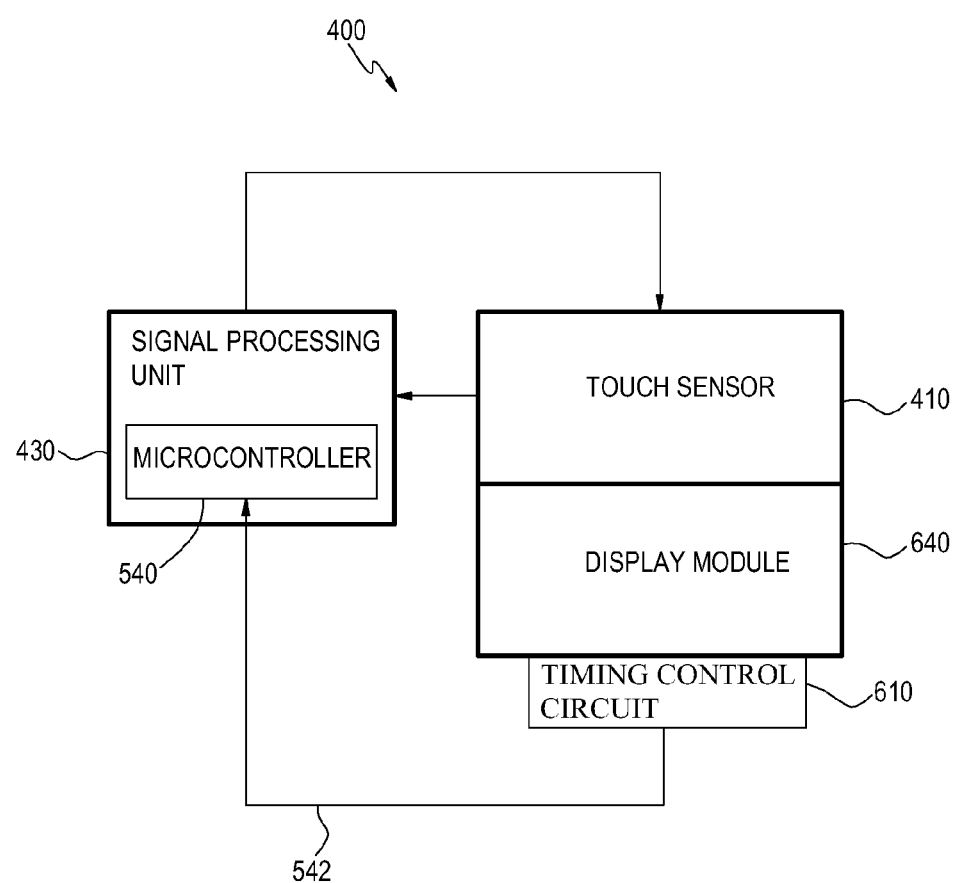
FIG. 5 is a schematic view of a touch panel according to an embodiment of this invention.

FIG. 5 is a schematic view of a touch panel 400 according to an embodiment of this invention, wherein the touch panel 400 includes a display module 640, a touch sensor 410 and a signal processing unit 430. The touch sensor 410 is deposed above the display module 640 (such as an LCD module), and is electrically connected to the signal processing unit 430.

The display module 640 can generate surface noises. For example, when pictures of the display module 640 are fast updated or pictures of the display module 640 is in a heavy loading, an unstable voltage is measured from a surface of the display module 640. A sensing signal outputted from the touch sensor 410 is interfered by the surface noises from the display module 640, so the sensing signal becomes an abnormal signal which includes the sensing signal and the surface noises. The abnormal signal is transmitted from the touch sensor 410 to the signal processing unit 430.

Figure 6:
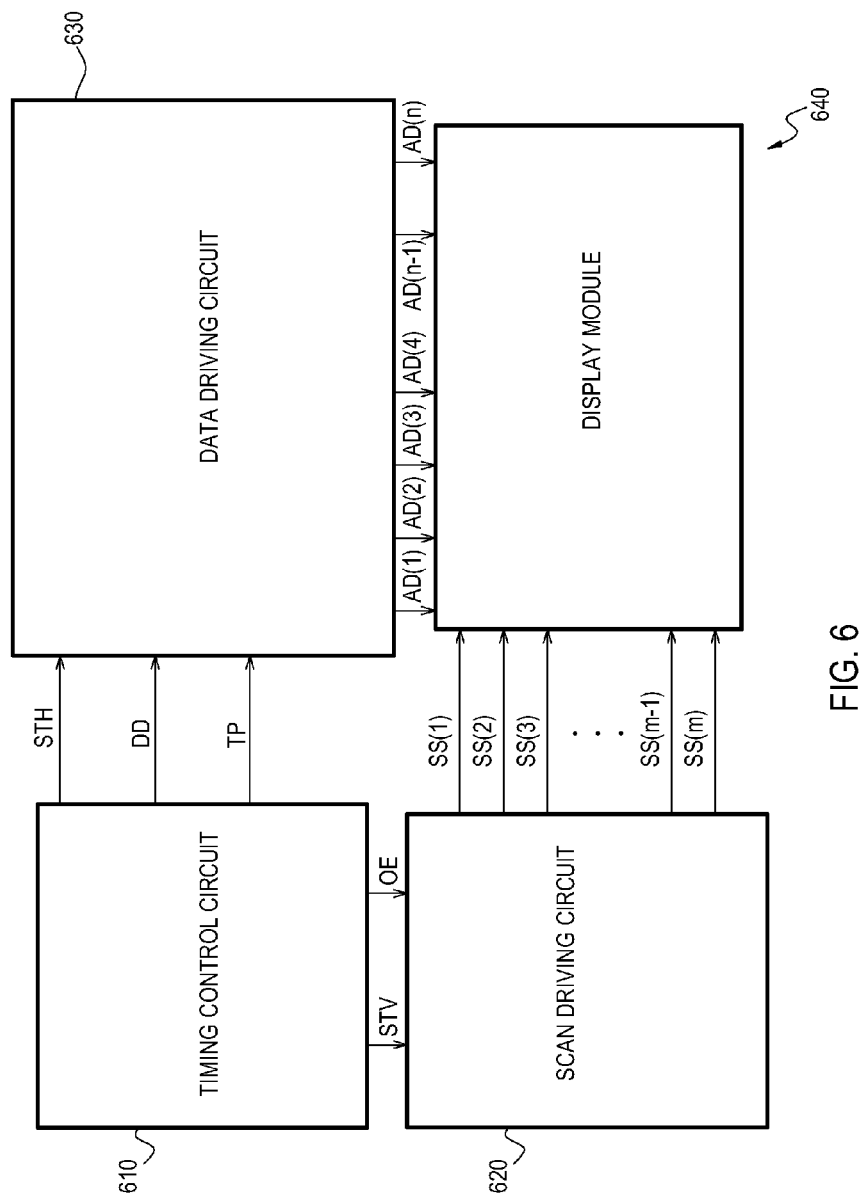
FIG. 6 is a schematic view of a display module according to an embodiment of this invention.

FIG. 6 is a schematic view of the display module 640 according to the embodiment of this invention. The display module 640 includes a timing control circuit 610, a scan driving circuit 620 and a data driving circuit 630. The timing control circuit 610 outputs vertical synchronizing signals STV and enable signals OE to the scan driving circuit 620. The scan driving circuit 620 outputs scanning signals SS(1)~SS(m) to scan lines of the display module 640. In coordination with timing of the scanning signals outputted from the scan driving circuit 620, the timing control circuit 610 also outputs horizontal synchronizing signals STH, digital display data DD and latch signals TP to the data driving circuit 630. The data driving circuit 630 outputs display signals AD(1)~AD(n) to data lines of the display module 640, so as to show images on the display module 640.

Figure 7:
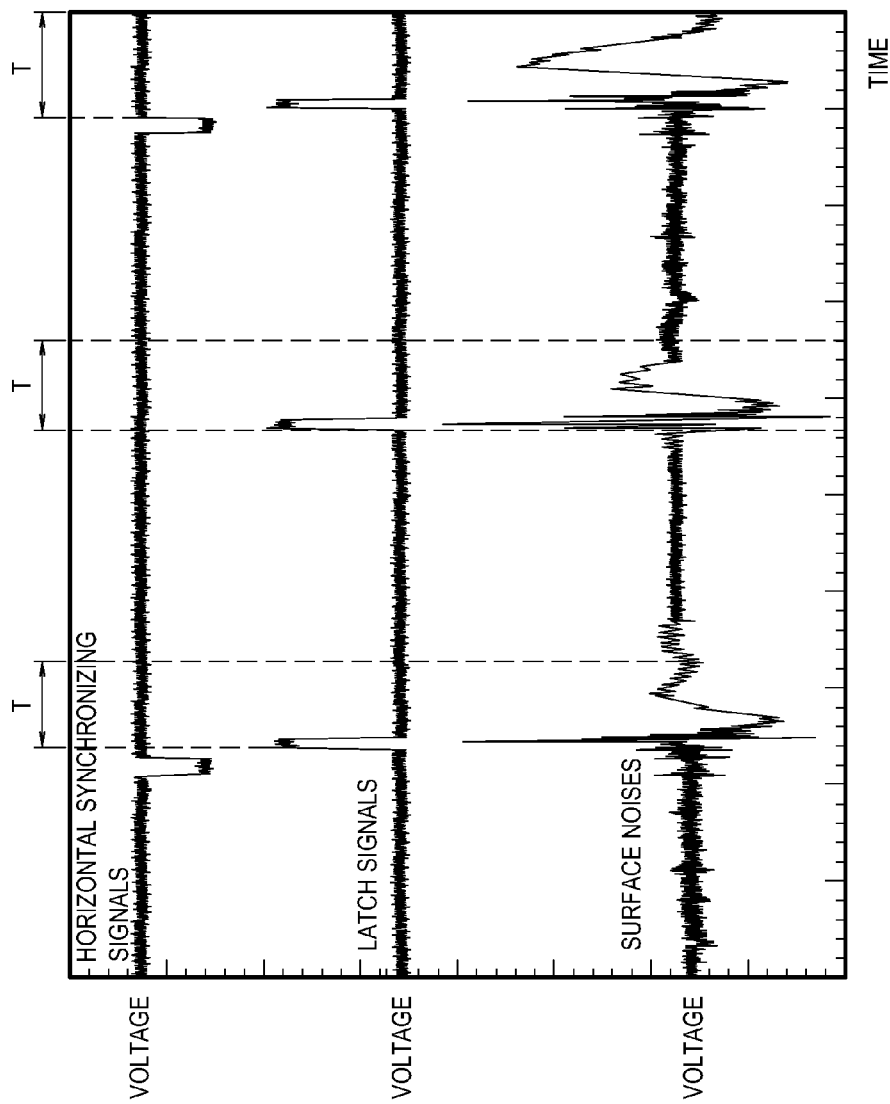
FIG. 7 is timing charts of horizontal synchronizing signals, latch signals and surface noises of the display module according to an embodiment of this invention.

FIG. 7 is timing charts of horizontal synchronizing signals, latch signals and surface noises of the display module 640. The surface noises of the display module 640 and the latch signals TP of the timing control circuit 610 are synchronized. On the other hand, the surface noises of the display module 640 and a horizontal synchronizing signal STH are not fully synchronized. The signal processing unit 430 includes a signal line 542 and a microcontroller 540. The microcontroller 540 is electrically connected to the timing control circuit 610 by the signal line 542 for receiving the latch signals, shown in FIG. 5. The latch signals have a plurality of duty periods, and each duty period has a rising edge and a falling edge. The microcontroller 540 received the abnormal signals, and can calculate predetermined times by utilising the rising edge and the falling edge of each duty period of the latch signals. The microcontroller 540 suspensively processes the sensing signals during the predetermined times, and then the microcontroller 540 continuously processes the sensing signals beyond the predetermined times so as to keep away from each period of the surface noises. For example, predetermined times T are calculated by utilising the rising edge of each duty period of the latch signals. The sensing signal will be not processed during the predetermined times T. The predetermined time T is longer than a generating time of each period of the surface noises of the display module 640. For example, the predetermined time T can be set to be longer than 3.52 μs.

Figure 8:
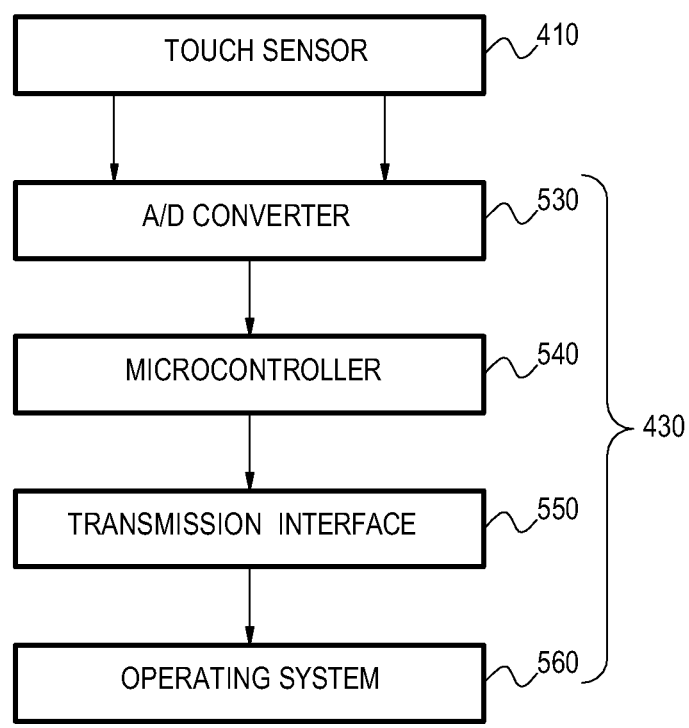
FIG. 8 is a schematic view of a signal processing unit and a touch sensor according to an embodiment of this invention.

With reference to FIG. 8, the signal processing unit 432 further includes an analog to digital (A/D) converter 530, a transmission interface 550 and an operating system 560. Initially, the touch sensor 410 should output only a sensing signal to the A/D converter 530. Unfortunately, the touch sensor 410 outputs the abnormal signal including the sensing signal and the surface noises to the A/D converter 530, because the touch sensor 410 is interfered by the surface noises from the display module 640. The A/D converter 530 converts analog types of the abnormal signal to digital types of the abnormal signal, and outputs the digital type of the abnormal signal to the microcontroller 540. After the microcontroller 540 receives the abnormal signal, the microcontroller 540 processes the abnormal signal except the generating time of each period of the surface noises. Then, the microcontroller unit 540 outputs control signals to the operating system 560 through the transmission interface 550, so the operating system 560 calculates and then determines touch locations on the touch panel 400. For example, when a touch panel is touched, a corresponding capacitance value is changed so as to cause the sensing signal being varied, and then touch locations are determined by the sensing signal. The signal processing unit 430 can be called as a touch IC.

Figure 9:
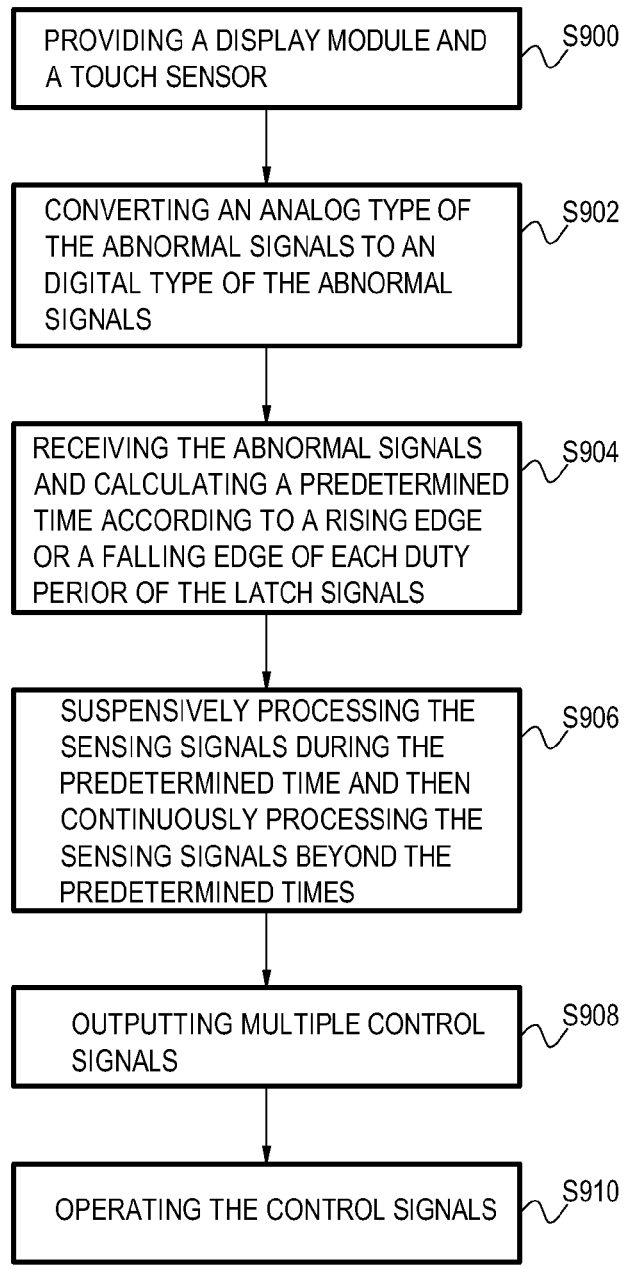
FIG. 9 is a flow chart showing a method for processing signals of the touch panel according to an embodiment of this invention.

FIG. 9 is a flow chart showing a method for processing signals of the touch panel 400 according to an embodiment of the present invention.

In step S900, a display module 640 and a touch sensor 410 are provided, wherein the display module 640 includes a timing control circuit 610, the timing control circuit 610 outputs latch signals TP; the display module 640 generates surface noises, the touch sensor 410 is deposed above the display module 640, and the touch sensor 410 outputs abnormal signals which each includes sensing signal and the surface noises. The surface noises synchronize with the latch signals, and are unstable voltages detected from a surface of the display module 640.

In step S902, analog types of the abnormal signals are converted to digital types of the abnormal signals.

In step S904, the abnormal signals are received and a predetermined time is calculated according to a rising edge or a falling edge of each duty period of the latch signals.

In step S906, the sensing signals are suspensively processed during the predetermined time, and then the sensing signals are continuously processed beyond the predetermined times so as to keep away from each period of the surface noises, wherein the predetermined time is longer than a generating time of each period of the surface noises.

In step S908, control signals are outputted.

In step S910, the control signals are operated so as to determine touch locations.

The touch panel including the signal processing unit of this invention can solve a misjudgment problem that the touch sensor is interfered by surface noises from the display module.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A touch panel comprising:
    a display module comprising a timing control circuit, a scan driving circuit and a data driving circuit, wherein the timing control circuit outputs a plurality of vertical synchronizing signals to the scan circuit, the timing control circuit outputs a plurality of horizontal synchronizing signals and a plurality of latch signals to the data driving circuit, the latch signals are different from the vertical synchronizing signals and the horizontal synchronizing signals, the display module generates a plurality of surface noises, the surface noises and the latch signals are synchronized, and the surface noises and the horizontal synchronizing signals are not fully synchronized;
    a touch sensor deposed above the display module and outputting a plurality of abnormal signals, wherein each abnormal signal include a sensing signal and the surface noises; and
    a signal processing unit electrically connected to the touch sensor and receiving the abnormal signals, wherein the signal processing unit calculates a predetermined time by utilizing a rising edge or a falling edge of each duty period of the latch signals, suspensively processes the sensing signal during the predetermined time, and then continuously processes the sensing signals beyond the predetermined times so as to keep away from each period of the surface noises.

2. The touch panel as claimed in claim 1, wherein the signal processing unit further comprises a signal line and a microcontroller; and the microcontroller is electrically connected to the timing control circuit by the signal line for receiving the latch signals.

3. The touch panel as claimed in claim 2, wherein the signal processing unit further comprises an A/D converter, a transmission interface and an operating system; the touch sensor outputs the abnormal signals to the A/D converter, the A/D converter converts analog types of the abnormal signal to digital types of the abnormal signal, the A/D converter outputs the digital type of the abnormal signal to the microcontroller, the microcontroller receives the abnormal signals, the microcontroller processes the abnormal signals except a generating time of each period of the surface noises, the microcontroller outputs a plurality of control signals to the operating system by the transmission interface, and the operating system calculates and determines touch locations.

4. The touch panel as claimed in claim 1, wherein the predetermined time is longer than a generating time of each period of the surface noises.

5. The touch panel as claimed in claim 1, wherein the predetermined time is set to be longer than 3.52 µs.

6. The touch panel as claimed in claim 1, wherein the surface noises are unstable voltages detected from a surface of the display module.

7. A method for processing signals of a touch panel comprising the following steps of:
    Step A: providing a display module and a touch sensor, wherein the display module comprises a timing control circuit, a scan driving circuit and a data driving circuit, the timing control circuit outputs a plurality of vertical synchronizing signals to the scan driving circuit, the timing control circuit outputs a plurality of horizontal synchronizing signals and outputting a plurality of latch signals to the data driving circuit, the latch signals are different from the vertical synchronizing signals and the horizontal synchronizing signals, the display module generates a plurality of surface noises, the surface noises and the latch signals are synchronized, the surface noises and the horizontal synchronizing signals are not fully synchronized, and the touch sensor is deposed above the display module and outputs a plurality of abnormal signals which each comprise a sensing signal and the surface noises;
    Step B: receiving the abnormal signals and calculating a predetermined time according to a rising edge or a falling edge of each duty period of the latch signals; and
    Step C: suspensively processing the sensing signals during the predetermined time and then continuously processing the sensing signals beyond the predetermined times so as to keep away from each period of the surface noises.

8. The method as claimed in claim 7 further comprising the steps of:
    after Step A, converting analog types of the abnormal signals to digital types of the abnormal signals;
    after Step C, outputting a plurality of control signals; and operating the control signals so as to determine touch locations.

9. The method as claimed in claim 7, wherein the predetermined time is longer than a generating time of each period of the surface noises.

* * * * *